(12) United States Patent
Shen et al.

(10) Patent No.: US 10,581,870 B2
(45) Date of Patent: Mar. 3, 2020

(54) PROXIMITY-BASED DEVICE AUTHENTICATION

(71) Applicant: Samsung Electronics Co., Ltd., Suwon-si, Gyeonggi-do (KR)

(72) Inventors: Yilin Shen, Mountain View, CA (US); Pengfei Hu, Mountain View, CA (US); Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 15/264,116

(22) Filed: Sep. 13, 2016

(65) Prior Publication Data

US 2018/0077168 A1 Mar. 15, 2018

(51) Int. Cl.
*H04W 48/04* (2009.01)
*H04L 29/06* (2006.01)
*G06F 1/3206* (2019.01)
*G06F 1/3234* (2019.01)
*G06F 1/3212* (2019.01)
*H04W 4/80* (2018.01)
(Continued)

(52) U.S. Cl.
CPC ............ *H04L 63/107* (2013.01); *G06F 1/325* (2013.01); *G06F 1/3206* (2013.01); *G06F 1/3212* (2013.01); *G06F 1/3215* (2013.01); *G06F 1/3296* (2013.01); *H04L 43/106* (2013.01); *H04L 43/16* (2013.01); *H04L 63/0428* (2013.01); *H04L 63/0492* (2013.01); *H04L 63/06* (2013.01); *H04L 63/083* (2013.01); *H04L 63/0876* (2013.01); *H04W 4/021* (2013.01); *H04W 4/80* (2018.02); *H04W 12/02* (2013.01); *H04W 12/04* (2013.01); *H04W 12/06* (2013.01); *H04W 12/00503* (2019.01); *Y02D 10/174* (2018.01)

(58) Field of Classification Search
None
See application file for complete search history.

(56) References Cited

U.S. PATENT DOCUMENTS 6,311,982 B1 * 11/2001 Lebensfeld .............. A63F 9/24
273/454
7,010,290 B2 3/2006 Dent
(Continued)

FOREIGN PATENT DOCUMENTS

WO 2015149882 A1 10/2015

OTHER PUBLICATIONS

The Cricket Location-Support System. Priyantha et al. ACM. (Year: 2008).*

(Continued)

*Primary Examiner* — Venkat Perungavoor

(57) ABSTRACT

An accurate distance between two devices can be determined in continuous and secure manner using modulated audible signals containing time-based information. This calculated distance can be used to lock and unlock one of the two devices such that if one of the devices, such as a smart phone or smart watch, is beyond a pre-configured distance from the other device, such as a laptop or tablet, the other device locks and may display a message to the user. The modulated messages contain time difference data of audible signal emission and receiving times which are used by each device to calculate an accurate estimate of the distance between the two devices.

19 Claims, 5 Drawing Sheets

(51) Int. Cl.

| | | |
|---|---|---|
| *H04L 12/26* | (2006.01) | |
| *H04W 12/02* | (2009.01) | |
| *G06F 1/3215* | (2019.01) | |
| *G06F 1/3296* | (2019.01) | |
| *H04W 4/021* | (2018.01) | |
| *H04W 12/04* | (2009.01) | |
| *H04W 12/06* | (2009.01) | |
| *H04W 12/08* | (2009.01) | |
| *H04W 12/00* | (2009.01) | |

(56) References Cited

U.S. PATENT DOCUMENTS

| | | | | |
|---|---|---|---|---|
| 8,826,415 | B2 | 9/2014 | Last | |
| 9,979,438 | B2* | 5/2018 | Belk | H04W 12/06 |
| 2001/0037676 | A1* | 11/2001 | Chang | G01F 1/66 |
| | | | | 73/114.33 |
| 2002/0100326 | A1* | 8/2002 | Stein | G01N 29/0609 |
| | | | | 73/597 |
| 2005/0018539 | A1* | 1/2005 | Komai | G01N 29/069 |
| | | | | 367/99 |
| 2008/0231498 | A1* | 9/2008 | Menzer | G01S 13/765 |
| | | | | 342/134 |
| 2008/0291883 | A1* | 11/2008 | Seok | H04W 64/00 |
| | | | | 370/338 |
| 2013/0294266 | A1* | 11/2013 | Lim | H04W 24/10 |
| | | | | 370/252 |
| 2014/0204715 | A1* | 7/2014 | Napolitano | G01S 1/763 |
| | | | | 367/125 |
| 2014/0213301 | A1* | 7/2014 | Evans | H04W 4/21 |
| | | | | 455/456.3 |
| 2014/0266907 | A1* | 9/2014 | Taylor, Jr. | G01S 5/10 |
| | | | | 342/387 |
| 2014/0269207 | A1* | 9/2014 | Baym | G10K 11/26 |
| | | | | 367/138 |
| 2014/0282877 | A1 | 9/2014 | Mahaffey et al. | |
| 2015/0072618 | A1* | 3/2015 | Granbery | H04W 4/21 |
| | | | | 455/41.2 |
| 2015/0133147 | A1* | 5/2015 | Prechner | G01S 5/14 |
| | | | | 455/456.1 |
| 2015/0271676 | A1* | 9/2015 | Shin | H04W 12/08 |
| | | | | 713/168 |
| 2015/0378020 | A1* | 12/2015 | Hama | G01S 15/025 |
| | | | | 367/91 |
| 2016/0091601 | A1* | 3/2016 | Karr | G01S 13/762 |
| | | | | 342/359 |
| 2016/0223640 | A1* | 8/2016 | Vilermo | G01S 5/0284 |
| 2016/0321917 | A1* | 11/2016 | Qiu | G08C 23/02 |
| 2016/0366022 | A1* | 12/2016 | Finkelstein | H04L 41/12 |

OTHER PUBLICATIONS

Modified K-Means Algorithm Using Timestamp Initialization in Sliding Window to Detect Anomaly Traffic. Putra et al. IEEE. (Year: 2015).*

KR 2013-01333916. English Translation. (Year: 2013).*

RF-Beep: A Light Ranging Scheme for Smart Devices. Uddin et al. IEEE. (Year: 2013).*

BeepBeep: A High-Accuracy Acoustic-Based System for Ranging and Localization Using COTS Devices. Peng et al. ACM. (Year: 2012).*

Extended European Search Report dated Apr. 8, 2019 regarding Application No. 17851123.4, 8 pages.

* cited by examiner

PROXIMITY-BASED DEVICE AUTHENTICATION

FIELD OF THE INVENTION

Embodiments of the present invention relate to device security and authentication. More specifically, they relate to authenticating a user for using a device based on proximity of another device using acoustic signals.

BACKGROUND

There has been a steadily increasing growth in the number of personal devices a typical user owns, carries or wears. Devices such as smartphones, tablets and laptops have been at constant risk of being left unattended thereby putting at risk the personal data on those devices being stolen. A user's proximity to these devices is a strong indication of whether these devices are in the user's physical control. With the increasing use of wearable devices such as smart watches, fitness trackers, and smart glasses, it is possible to exploit their proximity to the other devices (e.g., smart phones, tablets, laptops, cars, etc.) for user authentication.

Present techniques that use proximity for security or authentication provide only a low level of control because they rely on Received Signal Strength (RSS) which is unreliable for authentication purposes. In addition to the security and authentication issues caused by inaccurately detected distance between phone and wearable devices, attackers can also conduct spoofing attacks to gain access to another user's smart phone. Other acoustic-based methods have drawbacks, such as being vulnerable to man-in-the-middle attacks and are not suitable for applications with high security requirements. Other methods are more secure but have inadequate distance measurements between devices or are not able to detect distances in real time.

SUMMARY

In one aspect of the present invention, a method of accurately determining a distance between a trusted device and an authenticating device in a continuous and secure manner is described. A secure connection is established between the trusted device and the authenticating device through the exchange of connection request and reply messages. The trusted device transmits a modulated and encrypted message in the form of an audible signal to the authenticating device. In one embodiment, the message contains a timestamp and a time difference between specific, previous signal emitting and receiving times between the two devices. The trusted device receives a second modulated and encrypted message in response to sending the first message, wherein the second message contains a second timestamp and a second time difference. Time data in the two modulated messages are subsequently used to estimate or determine a distance between the two devices.

In one embodiment, the trusted device, such as a smart-watch or phone, calculates a third time difference between the first time difference and the second time difference. The third time difference may be used to calculate a distance between the two devices. In one embodiment, the first time difference is the difference in time between when a first previous message is received at the trusted device and the time a second previous message is emitted from the trusted device. In one embodiment, the second time difference is the difference in time the first previous message is emitted from the authenticating device and the time the second previous message is received at the authenticating device.

In one embodiment, the estimated distance between the trusted device and the authenticating device is used to lock the authenticating device if the distance between the two devices is greater than a user-configured distance. In another embodiment, a safety notification or other type of message may appear on the authenticating device if the distance between them exceeds a user-configurable distance.

BRIEF DESCRIPTION OF THE DRAWINGS

The invention and the advantages thereof, may best be understood by reference to the following description taken in conjunction with the accompanying drawings in which.

DETAILED DESCRIPTION

Methods and systems for a proximity-based authentication framework between two devices that is secure and unobtrusive are described in the various figures. In one embodiment, authentication is performed between two user devices where one device may be, for example, a wearable device and the other device is, for example, a phone, laptop or tablet. In other embodiments, the authentication framework can be used to securely connect devices in other scenarios where one of the devices is not a personal, user device. The wearable device, referred to as a vouching device authenticates a second user device, referred to as an authenticating device. The authenticating device is either locked or unlocked based on how far away the vouching device is. This is done by accurately and continuously measuring the distance between them using inaudible acoustic signals, as illustrated in one embodiment, in real time.

Figure 1:
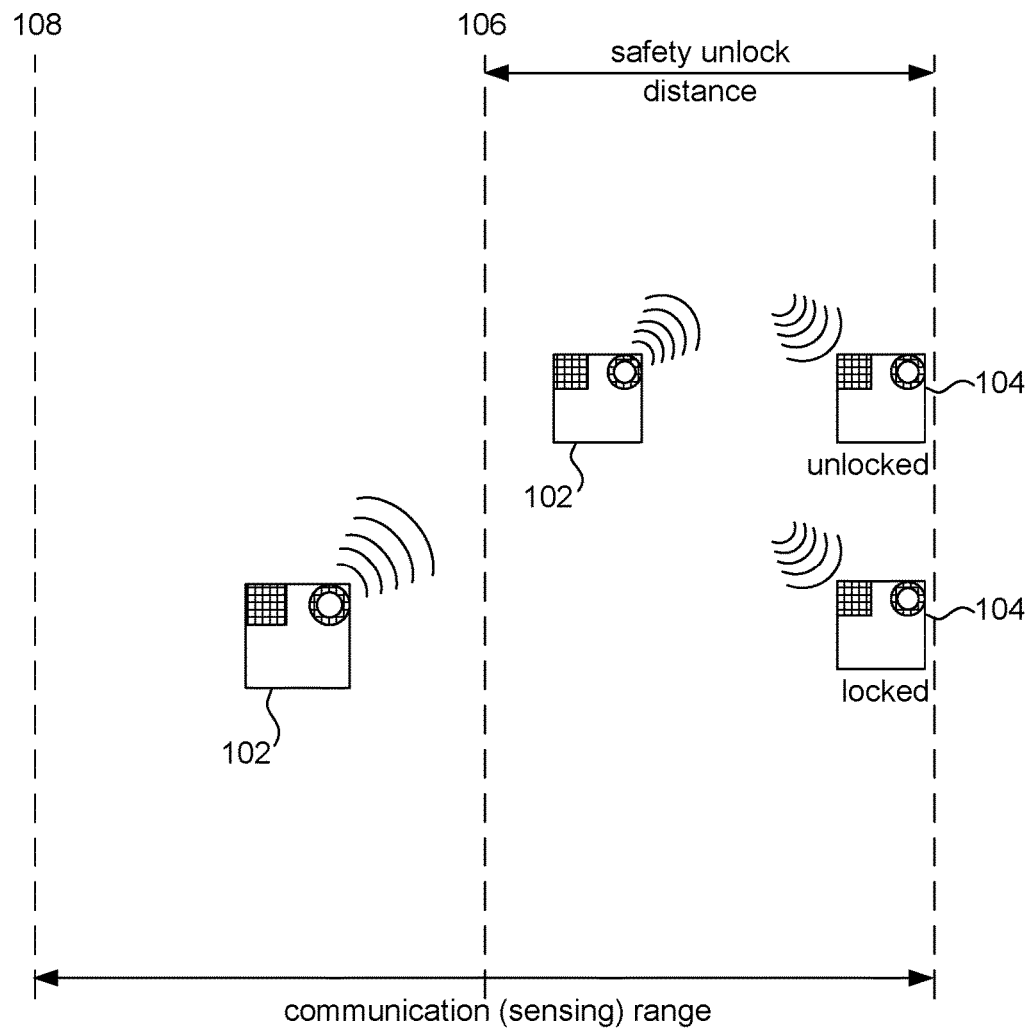
FIG. 1 is a block diagram showing a high-level view of the functionality of the proximity-based authentication scheme in accordance with one embodiment.

FIG. 1 is a block diagram showing a high-level view of the functionality of the proximity-based authentication scheme in accordance with one embodiment. Shown are two devices, each one has a speaker and a microphone or a means for emitting an acoustic signal and a means for detecting the same. One is a vouching device 102 and the other is an authenticating device 104.

Vouching device 102 is a device that is generally within the user's vicinity or physical control. In many cases this will be wearable device, such as a smart watch, fitness tracker, or smart glasses. Authenticating device 104 is not always within the user's physical control, such as a smart-phone (which may be left behind), tablet, laptop, gaming device, and the like. In one embodiment, one of the goals is that when the user wearing or physically controlling a vouching device beyond a certain distance from the portable device, such as a phone or laptop left in a public space, the portable device should lock so that its functions are not accessible if taken. There is a distance between them (e.g., selected by the user/owner) referred to as a safety unlock distance. This distance can be configured by the user via an interface (e.g., on the authenticating device). Another distance that can be set is a distance at which a notification appears on the authenticating device when the vouching device has been taken too far from the portable device and has locked, referred to as a safety notification distance. Each device has software for implementing the methods and systems of the embodiment of the present invention; the hardware does not change on either device.

In one embodiment, vouching device 102 is continuously emitting an ultra-sonic acoustic signal which is inaudible to the human ear. Authenticating device 104 has a microphone that is able to detect this signal. Dashed line 106 shows a safety unlock distance. Authenticating device 104 is unlocked when vouching device 102 is within the safety unlock distance. One of the objectives is to ensure that when vouching device 102 is at the safety unlock distance or closer, authenticating device 104 is unlocked and can be used by the user. When vouching device 102 is further away from authenticating device 104 than the safety unlock distance, authenticating device 104 automatically locks without the user having to take any actions. For example, vouching device 102 is a smart watch (with a speaker and microphone) that is worn by the user. Authenticating device 104 is a laptop computer. The user has previously set a safety unlock distance, for example, 20 feet (this can be done on either the watch or the laptop, or via a service interface). While the user is using the laptop, it is unlocked because the watch is within 20 feet. The distance between the devices is continuously being measured or detected using ultra-sonic acoustic signals emitted by the watch. As described below, the distance calculation is done alternatively on each device. If the user walks away from the laptop and goes beyond 20 feet, for example, in a café or other public space, the laptop automatically locks. A notification stating that the laptop is locked appears (and may make an audible sound) on the laptop (or on both devices). As noted, this is done by continuously measuring the distance between the two devices using an amplitude modulation signal.

The signal emitted by vouching device 102 can be detected by authenticating device 104 if the two devices are within a communication range shown by dashed line 108. The authentication scheme of an embodiment of the present invention is activated once the two devices are within this communication (sensing) range, the distance at which authenticating device 102 can detect signals from vouching device 104 and vice versa. If the devices are beyond the sensing range, the authentication scheme is not implemented. In this manner, if the user forgets her laptop or phone in a public place, the authenticating software executing on the device will cause the device to automatically lock (using pre-existing security features already on the device). As described below, the distance measurement between the two devices is done accurately in real time (e.g., within 10 mm?) and, more importantly, done securely to defend against certain kinds of attacks, such as spoofing.

Figure 2:
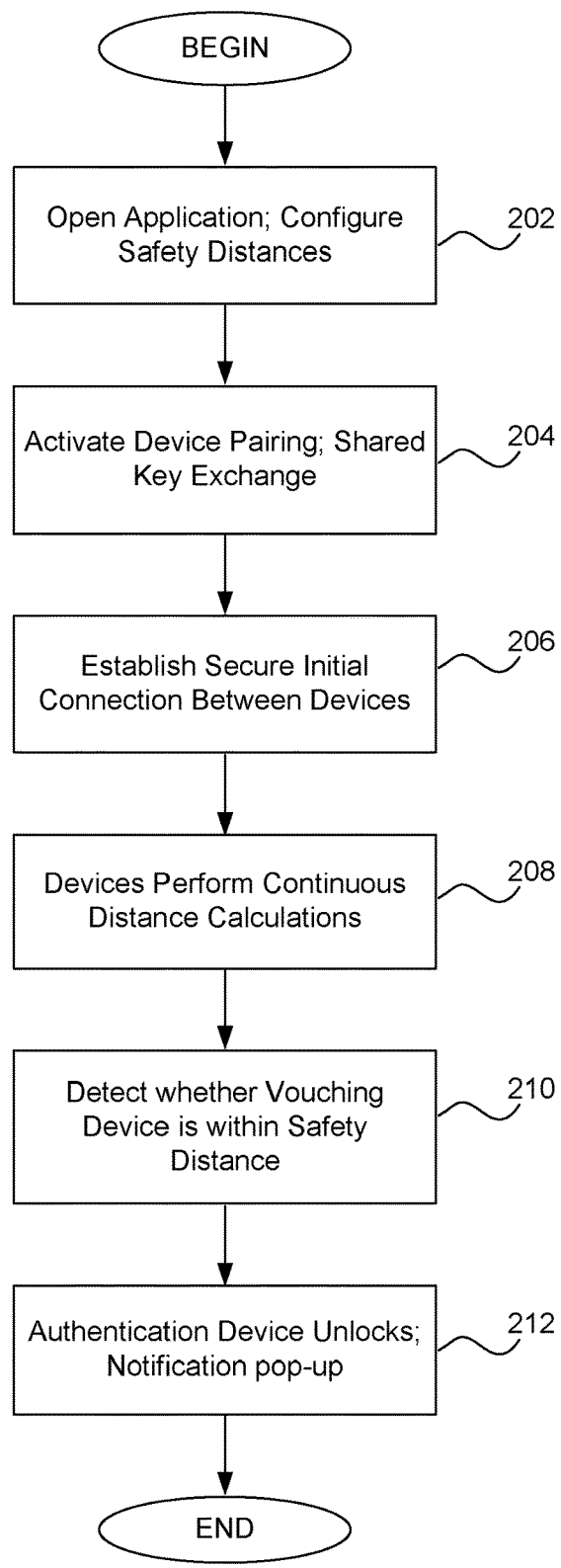
FIG. 2 is a flow chart showing an overview of the secure, acoustic-based authentication scheme in accordance with one embodiment.

FIG. 2 is a flow chart showing an overview of the secure, acoustic-based authentication scheme in accordance with one embodiment. The software needed for the embodiment of the present invention has been installed on the user devices. At step 202, the user opens the authenticating application on one of the devices (e.g., smart phone or laptop) and enters safety distances the user wants between devices. These can vary depending on the scenario the devices will be used in. As noted, the user configures a safety unlock distance and a safety notification distance which can be the same. At step 204 the user activates initial device pairing so that the vouching device and authenticating device can recognize of each other. The two devices also exchange a shared security key. One feature of the described embodiment is that the continuous proximity calculations between the devices be done securely; thus, the shared security key is used to encrypt messages sent between the two devices. The shared key may be updated periodically. When updated, the key exchange is performed again.

At step 206, an initial connection between the devices is established. This is described in FIG. 3. At step 208 the two devices alternate performing real time distance detection using the shared security key and a modulated amplitude signal as described below. At step 210 the authentication device detects whether the vouching device has moved to a location that is within the safety unlock distance. If the vouching device has moved within this distance, the authenticating device automatically unlocks. If this event occurs, control goes to step 212 where the portable device unlocks and/or a notification appears on the authenticating device. The real time distance detection continues. The proximity detection continues between the two devices until the two devices are out of the sensing area/communication range of each other. Conversely, the authenticating device automatically locks when the user moves to a point farther away than the safety unlock distance. Safety notifications appear on the smart phone only if the user is within the safety notification distance.

Figure 3:
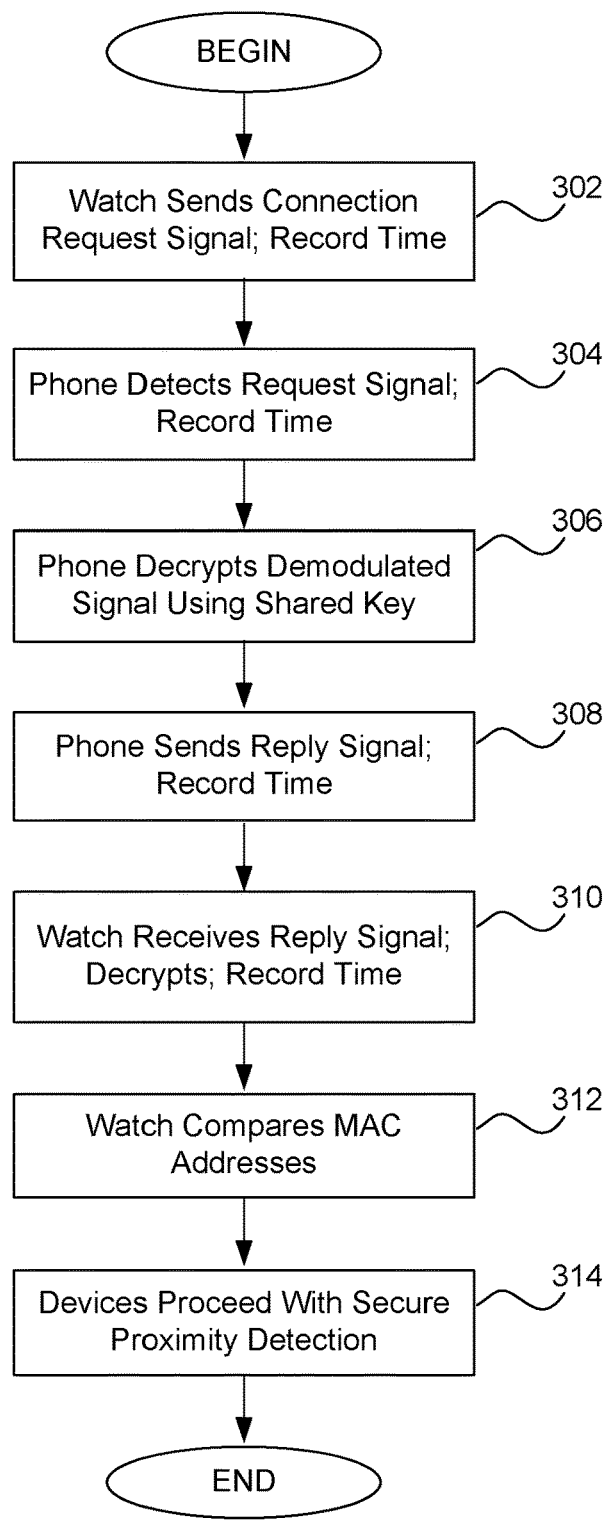
FIG. 3 is a flow diagram of an initialization process between two devices in accordance with one embodiment.

FIG. 3 is a flow diagram of an initialization process between two devices in accordance with one embodiment. The devices have already been paired. They know each other's MAC addresses or other unique identifying information. They both have the shared key for encrypting messages.

Before the process begins, the vouching device, such as a smart watch, comes within communication range of the authentication device, such as a smart phone. As noted, this is the range within which the acoustic signal sent by the watch can be detected (i.e., heard) by the phone.

Using the smart phone and watch as the devices, at step 302 the watch sends out a connection request signal. Transmitting this message is done continuously by the watch. The connection request signal contains an encrypted MAC address of the watch, the encryption performed using the shared key. The watch modulates the signal into an ultra-sonic acoustic signal, not audible by the human ear. The smart watch records two times with respect to the request signal, one for the time that the software on the watch issued the command to send the signal (issue time) and another for the time that the signal was actually emitted from the watch (emit time). The emit time for the first connection request signal received by the phone is used later in the process and is denoted as $t_{r0}$.

At step 304 the smart phone detects the connection request signal through its microphone. This first signal received by the phone is denoted as $m_0$. As noted, the emitting time of $m_0$ is $t_{r0}$. The phone records the time at which it detected or received the modulated and encrypted connection request $m_0$ as $t_{40}$. The software on the phone demodulates the signal. At step 306 the software decrypts the demodulated signal using the shared key and obtains the MAC address of the watch. It checks whether this is the same MAC address as the one it obtained for the watch when the two devices were paired. If it is not or if the watch cannot decrypt the message with the key, the process ends.

At step 308 the phone sends an encrypted reply signal or message to the watch, denoted as $m_1$. The reply signal is modulated into an acoustic signal and contains the encrypted MAC address of the phone. It also records the time at which the signal is emitted from the speaker as $t_{A1}$. At step 310 the microphone on the watch detects the reply signal. It proceeds to demodulate the signal and decrypt it using the shared key. The software on the watch also marks the time that the reply signal was received, denoted as $t_{V1}$. At step 312 the watch compares the MAC address in the message to the one it has for the phone. If they are the same, the two devices are now able to securely communicate with each other. At step 314 secure and continuous proximity detection between the devices can begin.

Figure 4:
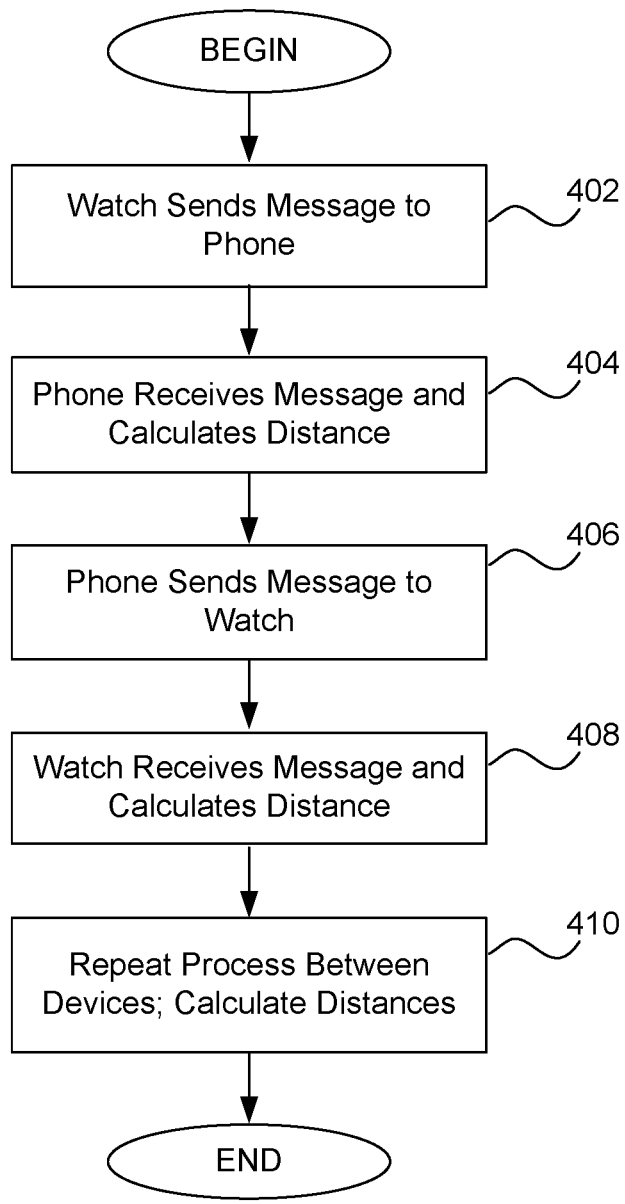
FIG. 4 is a flow diagram of a process of acoustic-based proximity detection between two devices in accordance with one embodiment.

FIG. 4 is a flow diagram of a process of acoustic-based proximity detection between two devices in accordance with one embodiment. The two devices have already exchanged two messages, $m_0$ and $m_1$, which contained encrypted device identifying data, typically MAC addresses. The devices also record signal times emission times and arrival times. The devices continue to exchange messages, but the content of the messages is now different, as described below.

At step 402 the watch sends a third message, $m_2$, modulated to an acoustic signal and encrypted using the shared key, to the smart phone. The content of the message contains a timestamp $t^*_{V2}$ to denote when the message was modulated. The timestamp is used to ensure the freshness of the message and the order of messages (to ensure that they correspond to each authentication round). It also contains a difference in time between the time when the watch received the previous signal, $t_{V0}$ (in the first post-initialization round, the signal is the connection request signal) and when the phone emitted a reply signal to the watch, $t_{V1}$ (in this case, a connection reply signal). The difference in time is denoted as $t_{V1}-t_{V0}$.

At step 404 the phone receives message m2 and now has data needed to calculate the distance between the two devices based on time-of-flight. In one embodiment, the following equation can be used to calculate the distance: $c/2*[(t_{A1}-t_{A0})-(t_{V1}-t_{V0})]$, where c is the speed of sound in air (about 340 m/s).

At step 406 the phone sends a message, $m_3$, to the watch. The message contains a timestamp of when the message is modulated and a time difference, denoted as $t_{A2}-t_{A1}$. Once the watch receives $m_3$, it uses the equation to determine an estimate of the distance between the two devices at 408. At step 410 the process repeats for each of the devices. The device receiving a signal performs one proximity estimation using the time differences described above where $A_i$ and $V_i$ is incremented by one to $A_{i+1}$ and $V_{i+1}$. The signals are no longer the connection request signal but messages containing the time stamp and time difference. The process continues between the two devices until the watch is out of communication range of the phone. Each time a distance estimation is calculated, the value is compared to the safety unlock distance and the notification distance.

In another embodiment, a sample count is used instead of time differences to calculate distance. Both authenticating and vouching devices record at a sampling rate 44.1 kHz when sending a message. The message is also recorded by the device. Using the recorded signal, the transmitting device (whether authenticating or vouching device) can count the samples between the point of emitting the signal and the arrival point of the signal at the receiving device. As such, the sample count can be used instead of the time difference. This sample count may provide a more accurate distance estimation between the devices.

Another factor that should be considered when calculating distance between devices is user movement or mobility since the user will typically be wearing or carrying the vouching device. In one embodiment, the relative speed of device movement is needed. As described above, the vouching device first sends a signal $m_0$ and records the time $t_{V0}$. Then, the authenticating device records the arrival time of this signal as $t_{A0}$. On the other hand, the vouching device will receive a signal $m_1$ and record the timestamp $t_{V1}$, authenticating device will also record the emitting timestamp $t_{A1}$ of $m_1$.

Without loss of generality, it can be assumed that the vouching device moves during the transmission and its relative speed is v. Then, the following can be used for distance estimation:

$$d^0_{AV} = c*(t_{A0}-t_{V0})$$

which is calculated when the signal $m_0$ arrives at the authenticating device. The distance between authenticating and vouching devices can be denoted by $d^{0*}_{AV}$ when the signal $m_0$ leaves vouching device. Next, the authenticating device sends signal $m_1$. Similarly, the following distance $d_{AV}$ is obtained between them when the signal $m_1$ arrives the authenticating device:

$$d^1_{AV} = c*(t_{V1}-t_{A1})$$

and the distance $d^{1*}_{AV}$ represents the signal $m_1$ leaves authenticating device. As the relative speed of devices is much less than the speed of acoustic signal, $d^0_{AV} \approx d^{0*}_{AV}$ and $d^1_{AV} \approx d^{1*}_{AV}$ are considered.

As the vouching device has some delay in issuing the signal $s_1$, the following relation for $d^0_{AV}$ and $d^1_{AV}$ are as follows: $d^1_{AV}-d^0_{AV}=v*(t_{V1}-t_{V0})$.

With the Doppler effect, the relative speed of movement v can be estimated. Since no synchronization is required with $t_{V1}-t_{V0}$, then the right hand side can be obtained. By summing up above two equations, the following relations are obtained: $d^1_{AV}+d^0_{AV}=c*[(t_{V1}-t_{V0})-(t_{A1}-t_{A0})]$.

Likewise, the value of right hand side can be calculated since no synchronization is required. Therefore, $d^0_{AV}$ and $d^1_{AV}$ can be obtained. To this end, the current distance $d^2_{AV}$ can be calculated as follows: $d^2_{AV}=d^1_{AV}-v*(t_{V2}-t_{V1})$.

To measure the proximity while there is a relative movement between the authenticating device and the vouching device, it is necessary to determine the relative speed (v) of the movement. Doppler effect can be used for estimating v.

Doppler effect states that if there is a relative movement between the sender and the receiver, the frequency of the received signal will shift as follows: $f=(v/v_a)*f_0$ where f is the frequency shift from the original frequency $f_0$, v is the relative speed between sender and receiver, $v_a$ is the speed of the acoustic signal. For example, the sound speed is 340 m/s at 25 Celsius, if the original frequency of the acoustic signal is 20 kHz and the frequency shift is 1 Hz, the speed of the relative movement can be calculated as $1*340/20$ k=0.017 m/s=1.7 cm/s.

In real-world user mobility scenarios, the estimation of v is not straight forward even using Doppler effect. This is because user's motion is not uniform especially when she is walking. If the vouching device is user's smartwatch, the watch swings back and forth on user's arm while walking. Similarly, if the user's smartphone is the vouching device, it also swings back and forth while being in user's pocket while walking. Apart from this, back and forth motion, user's walking speed also vary even within a step between its start, middle and end. Even with high authentication rate of one authentication every second, most people would complete one step (common walks speed is about 1.4 m/s) within the second.

To get a better estimate of average speed for a period of time, we could split the period into shorter period and estimate the speed for each short period to make the speed more real-time. However, the short period will result in a smaller block with fewer samples of acoustic waves to analyze, which in turn reduces the frequency resolution. The frequency resolution is calculated as $F_S/N$ where N is the number of samples of the acoustic signal within the block and $F_S$ is the sampling rate. For example, performing speed estimation at every 200 ms, the available samples are 8820, the frequency resolution is 44100/8820=5 Hz and corresponding speed estimation resolution is 5*1.7 cm=8.5 cm. This way, there exists a trade-off between the observed speed resolution and the real-time speed.

In some embodiments, power consumption can be reduced on either or both of the devices. In one embodiment, power consumption can be reduced based on device motion. For example, when the vouching device is moving towards the authenticating device, transmission power of the speaker on the vouching device automatically decreases based on the shorter distance between the devices. When the vouching device is moving farther away, transmission power of the speaker can increase if needed.

In another embodiment, the frequency of (i.e., number of times) the acoustic signal is transmitted may be adjusted based on the remaining battery power of either device. For example, when the estimated distance between the devices increases, the devices reduce the frequency of signal transmission (emission) to reduce power consumption on either or both devices.

In another embodiment, multiple pairs of device authentication can be supported. It can handle authentication between multiple pairs of devices that are at the same location and at the same time. This is done by breaking up the bandwidth using frequency division modulation and selecting one channel for one pair of devices.

Figure 5:
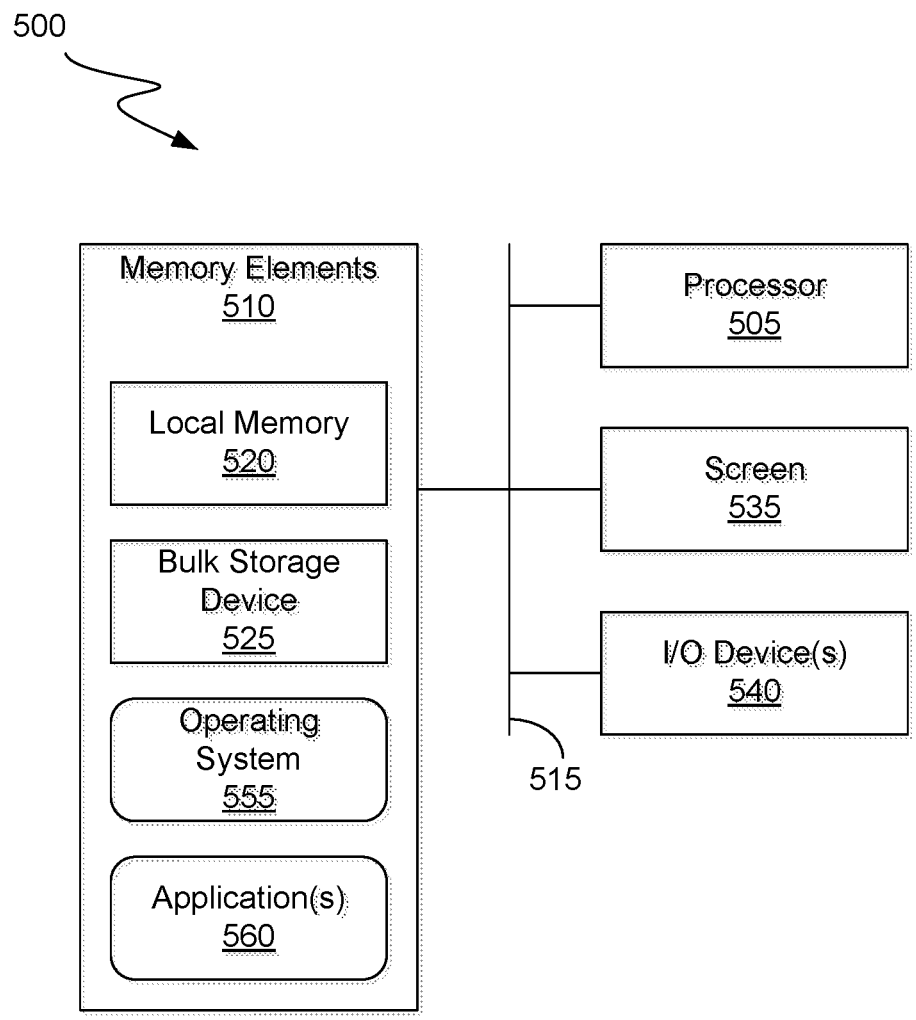
FIG. 5 is a block diagram of a data processing system in accordance with one embodiment.

FIG. 5 is a block diagram of a data processing system 500 in accordance with one embodiment. System 500 may be used to implement any of a variety of systems and/or computing devices that include a processor and memory and that are capable of performing the operations described within this disclosure. In one embodiment, it can be used to implement a vouching device or an authenticating device. It can also be used to execute computer instructions to implement flowcharts described above.

As pictured, system 500 includes at least one processor 505 coupled to memory elements 510 through a system bus 515 or other suitable circuitry such as an input/output (I/O) subsystem. System 500 stores program code within memory elements 510. Processor 505 executes the program code accessed from memory elements 510 via system bus 515. Memory elements 510 include one or more physical memory devices such as, for example, a local memory 520 and one or more bulk storage devices 525. Local memory 520 refers to random access memory (RAM) or other non-persistent memory device(s) generally used during actual execution of the program code. Bulk storage device 525 may be implemented as a hard disk drive (HDD), solid state drive (SSD), or other persistent data storage device. System 500 may also include one or more cache memories (not shown) that provide temporary storage of at least some program code in order to reduce the number of times program code must be retrieved from bulk storage device 525 during execution.

System 500 may be coupled to one or more I/O devices such as a screen 535 and one or more additional I/O device(s) 540. The I/O devices described herein may be coupled to system 500 either directly or through intervening I/O controllers. In one aspect, screen 535 may be implemented as a display device that is not touch sensitive, such as a TV display. In another aspect, screen 535 may be implemented as a display device that is touch sensitive.

Examples of I/O device(s) 540 may include, but are not limited to, a universal remote control device, a keyboard, a mobile device, a pointing device, a controller, a camera, a speaker, and a microphone. In some cases, one or more of the I/O device(s) may be combined as in the case where a touch sensitive display device (e.g., a touchscreen) is used as screen 535. In that case, screen 535 may also implement a keyboard and a pointing device. Other examples of I/O devices 540 may include sensors. Exemplary sensors may include, but are not limited to, an accelerometer, a light sensor, touch screen sensors, one or more biometric sensors, a gyroscope, a compass, or the like.

I/O devices 540 may also include one or more network adapter(s). A network adapter is a communication circuit configured to establish wired and/or wireless communication links with other devices. The communication links may be established over a network or as peer-to-peer communication links. Accordingly, network adapters enable system 500 to become coupled to other systems, computer systems, remote printers, and/or remote storage devices, such as remote servers storing content. Examples of network adapter(s) may include, but are not limited to, modems, cable modems, Ethernet cards, wireless transceivers, whether short and/or long range wireless transceivers (e.g., cellular transceivers, 802.11x (Wi-Fi™) compatible transceivers, Bluetooth® compatible transceivers, and the like).

As pictured in FIG. 5, memory elements 510 may store an operating system 555 and one or more application(s) 560, such as content source applications, game applications, or showcase applications. In one aspect, operating system 555 and application(s) 560, being implemented in the form of executable program code, are executed by system 500 and, more particularly, by processor 505. As such, operating system 555 and application(s) 560 may be considered an integrated part of system 500. Operating system 555, application(s) 560, and any data items used, generated, and/or operated upon by system 500 are functional data structures that impart functionality when employed as part of system 500.

In one aspect, system 500 may be used to implement a smart watch, smart phone, laptop, tablet, or car. Examples of mobile computing devices may include, but are not limited to, a smart phone, a tablet computer, a mobile media device, and a game console, a mobile internet device (MID), a personal digital assistant, a laptop computer, a mobile appliance device, or the like.

System 500 may include fewer components than shown or additional components not illustrated in FIG. 5 depending upon the particular type of device that is implemented. In addition, the particular operating system and/or application(s) included may also vary according to device type as may the types of network adapter(s) included. Further, one or more of the illustrative components may be incorporated into, or otherwise form a portion of, another component. For example, a processor may include at least some memory.

Various embodiments described herein involve distinct features. It should be appreciated that any feature or functionality from one figure or embodiment may be incorporated into any other figure or embodiment.

Although only a few embodiments of the invention have been described in detail, it should be appreciated that the invention may be implemented in many other forms without departing from the spirit or scope of the invention. It should be appreciated that in some embodiments, one or more of the steps in the methods may be modified, reordered and/or deleted. Therefore, the present embodiments should be considered illustrative and not restrictive and the invention is not to be limited to the details given herein.

What is claimed is:

1. A method of determining a distance between a first device and a second device, the method comprising:
   transmitting, by the first device, a first modulated acoustic signal containing a first timestamp and a first time difference, wherein the first time difference is the difference in time a first previous message is received at the first device and a second previous message is emitted from the first device;
   receiving, by the first device, a second modulated acoustic signal in response to the first modulated acoustic signal containing a second timestamp and a second time difference, wherein the second time difference is the difference in time the first previous message is emitted from the second device and a third previous message is received at the second device;
   determining, by the first device, a distance between the first device and the second device based on data in the first modulated acoustic signal and the second modulated acoustic signal; and
   controlling, by the first device, a security feature of the second device based on the distance between the first device and the second device,
   wherein the second device receives a notification when the distance between the first device and the second device exceeds a threshold notification distance.

2. The method as recited in claim 1, wherein determining the distance further comprises:
   calculating a third time difference between the first time difference and the second time difference; and
   multiplying the third time difference by a speed of sound and dividing by two.

3. The method as recited in claim 1, wherein the first timestamp indicates when first acoustic signal is modulated at the first device and the second timestamp indicates when second acoustic signal is modulated at the second device.

4. The method as recited in claim 1, wherein the second modulated acoustic signal is encrypted, and further comprising: demodulating the second modulated acoustic signal; and decrypting the demodulated acoustic signal using a shared key.

5. The method as recited in claim 1, further comprising establishing a secure connection with the second device including:
   transmitting a connection request;
   recording a connection request time;
   receiving a response; and
   recording a response time.

6. The method as recited in claim 5, wherein the connection request contains encrypted identity information of the first device and the response contains encrypted identity information of the second device wherein the connection request and the response are decrypted using a shared key.

7. The method as recited in claim 1, wherein the second device locks when the distance between the first device and the second device exceeds a threshold locking distance.

8. The method as recited in claim 1, further comprising:
   decreasing speaker transmission power when determined distance changes are decreasing, wherein battery power is conserved when the first device and the second device are in closer proximity to each other.

9. The method as recited in claim 1, further comprising:
   decreasing frequency of message transmission based on remaining battery power.

10. The method as recited in claim 1, further comprising:
    estimating a relative speed of movement between the first device and the second device utilizing a Doppler effect.

11. A device comprising:
    a speaker;
    a microphone;
    a communication circuit;
    at least one processor configured to:
       transmit, via the communication circuit, a first modulated acoustic signal containing a first timestamp and a first time difference, wherein the first time difference is the difference in time a first previous message is received at the device and a second previous message is emitted from the device,
       receive, via the communication circuit, a second modulated acoustic signal in response to the first modulated acoustic signal containing a second timestamp and a second time difference, wherein the second time difference is the difference in time the first previous message is emitted from a second device and a third previous message is received at the second device,
       determine a distance between the device and the second device based on data in the first modulated acoustic signal and the second modulated acoustic signal, and
       control a security feature of the second device based on the distance between the device and the second device,
       wherein the second device receives a notification when the distance between the device and the second device exceeds a threshold notification distance.

12. The device as recited in claim 11, wherein to determine the distance, the at least one processor is configured to calculate a third time difference between the first time difference and the second time difference.

13. The device as recited in claim 11, wherein the second modulated acoustic signal is encrypted and the at least one processor is configured to:
    demodulate the second modulated acoustic signal; and
    decrypt the demodulated acoustic signal using a shared key.

14. The device as recited in claim 11, wherein the at least one processor is configured to establish a secure connection with the second device by:
    transmitting a connection request;
    recording a connection request time;
    receiving a response; and
    recording a response time.

15. The device as recited in claim 11, wherein the at least one processor is configured to decrease a speaker transmission power when determined distance changes are decreasing.

16. A non-transitory computer readable medium including a plurality of instructions that, when executed by a processor in a first device, are configured to cause the processor to:
    transmit, to a second device, a first modulated acoustic signal containing a first timestamp and a first time difference, wherein the first time difference is the difference in time a first previous message is received at the first device and a second previous message is emitted from the first device;
    receive a second modulated acoustic signal in response to the first modulated acoustic signal containing a second timestamp and a second time difference, wherein the second time difference is the difference in time the first previous message is emitted from the second device and a third previous message is received at the second device;

determine a distance between the first device and the second device based on data in the first modulated acoustic signal and the second modulated acoustic signal; and control a security feature of the second device based on the distance between the first device and the second device, wherein the second device receives a notification when the distance between the first device and the second device exceeds a threshold notification distance.

17. The non-transitory computer readable medium of claim 16, wherein the plurality of instructions is further configured to cause the processor to calculate a third time difference between the first time difference and the second time difference.

18. The non-transitory computer readable medium of claim 16, wherein the second modulated acoustic signal is encrypted and the plurality of instructions is further configured to cause the processor to:

demodulate the second modulated acoustic signal; and decrypt the demodulated acoustic signal using a shared key.

19. The non-transitory computer readable medium of claim 16, wherein the plurality of instructions is further configured to cause the processor to establish a secure connection with the second device by:

transmitting a connection request;

recording a connection request time;

receiving a response; and recording a response time.

* * * * *